UNITED STATES PATENT OFFICE.

LEWIS A. BROWN, OF ST. LOUIS, MISSOURI, ASSIGNOR OF ONE-HALF TO DWIGHT TREDWAY, OF SAME PLACE.

PROCESS OF FORMING COMPOSITION OF MATTER.

SPECIFICATION forming part of Letters Patent No. 672,352, dated April 16, 1901.

Application filed November 19, 1900. Serial No. 37,044. (No specimens.)

*To all whom it may concern:*

Be it known that I, LEWIS A. BROWN, of the city of St. Louis, State of Missouri, have invented certain new and useful Improvements in Processes of Forming Composition of Matter, of which the following is a full, clear, and exact description.

This invention relates to the process of forming a composition of matter, and has for its object to simplify and render more expeditious the formation of a composition of matter which I have described in a separate application filed at the same time with this one.

The composition has as ingredients sand, sixty per cent.; cement, ten per cent.; sulfur, twenty per cent.; lampblack, five per cent., and coloring-matter, five per cent.

The process by which the composition is formed consists in reducing the amount of sulfur required to form the composition to a liquid state and mixing therewith the cement, which may be either natural or artificial. The sand before being mixed with the cement and sulfur is heated to a high temperature, about 500° Fahrenheit, in order to remove all the impurities possible and solidify the mixture after it is placed therein. The sand while still heated is mixed with the cement and sulfur and forms a solid mass. The mass is then liquefied by applying a temperature of about 750° Fahrenheit, and while in this state the lampblack is mixed therewith in order to render the mass porous and fusible. The temperature of 750° is maintained for about fifteen minutes, and while being in this state the pigments are added to give the desired color, after which the temperature is gradually reduced to about 300°, at which stage the mass becomes viscid and pliable and in a condition to be poured into the mold to be formed into the object desired.

I claim—

1. The process of forming a composition of matter having sand, cement, sulfur and lampblack as ingredients, consisting in liquefying the sulfur by heat, mixing the cement therewith, heating the sand and adding it to the mixture, increasing the temperature to 750° and adding the lampblack, substantially as specified.

2. The process of forming a composition of matter having sand, cement, sulfur, lampblack and coloring-matter as ingredients, consisting in liquefying the sulfur by heat, mixing the cement therewith, heating the sand and adding it to the mixture, increasing the temperature to 750°, adding the lampblack, and adding pigments to give color and reducing the temperature till the mass becomes soft and pliable, substantially as specified.

In testimony whereof I affix my signature in presence of two witnesses.

LEWIS A. BROWN.

Witnesses:
ALFRED A. EICKS,
JOHN D. RIPPEY.